Patented Dec. 13, 1938

2,140,238

UNITED STATES PATENT OFFICE 2,140,238

WELDING WIRE FOR ELECTRIC ARC WELDING

Franz Leitner, Kapfenberg, Steiermark, Austria

No Drawing. Application March 9, 1937, Serial No. 129,960. In Austria August 1, 1936

3 Claims. (Cl. 219—8)

Welding on high class construction jobs especially if dynamic loads are to be met calls for a welding wire, which besides high tensile strength and ductility ensures high fatigue strength of the weld-metal. This is generally achieved by a good-quality covered electrode; the covering, however, is responsible for a number of disadvantages. Vertical and overhead welds can only be run with great difficulties, and fillet-welds often reveal undercutting-voids that weaken the parent-metal and lessen the fatigue-strength. Moreover, covered electrodes cause slag entrapments which are very detrimental with multiple-pass welds.

For welding high grade steels also alloyed bare-wire electrodes are applicable producing a good weld. And there have been developed e. g. welding rods of iron or steel alloyed with aluminum and/or titanium furnishing satisfactory strength figures of the weld metal. Such wires, however, are not applicable for vertical and overhead welds—and what is more unfortunate—they prohibit welding by either alternating current or on the negative pole. The additional use of a coating is bound to the aforesaid defects.

To ensure general weldability of such highly suitable alloys for super-quality welds, e. g. also for overhead and vertical beads, and with alternating current and on the negative pole, the invention makes use of a core, by welding with rods of iron or steel alloyed with Al and/or Ti which makes welding possible in any position. Thus the field of application is being materially widened for a valuable electrode so far confined to special jobs only.

The use of a core, known in the art, brings about remarkable improvements for the alloy too.

With an electrode e. g. alloyed with 0.6 per cent titanium a weld can be produced possessing 55 kilo per sq. mm. A lengthwise butt-welded joint made with such a wire and tested on the pulsator turns out at $10^6$ reversals, if not machined, a tensile-fatigue strength (natural-limit stress) of 18 kilo per sq. mm. Transversal test specimens produced with the same wire type show at a number of $10^6$ reversals, if not machined, a fatigue strength of 14 kilo per sq. mm., and if machined, a fatigue strength of 17 kilo per sq. mm. An electrode alloyed with 0.2 per cent aluminum and 0.5 per cent titanium possesses a strength of 60 kilo per sq. mm., and on the lengthwise welded machined specimen, under the same test conditions, a tensile-fatigue strength of 19.5 kilo per sq. mm.

Evidently, strength figures are achieved considerably over the one obtained with bare-wire electrodes.

Preferably the aluminum content is 0.05–0.7 per cent, the titanium content 0.1–1.5 per cent. Are both elements alloyed jointly, the total of alloying shall not exceed 2 per cent.

To further improve both weldability and the weld a core material may be used containing 80–95 per cent lime and 20 to 5 per cent aluminum.

I claim:

1. A welding wire for electric arc welding comprising a ferrous electrode containing at least one metal selected from the group consisting of 0.05 to 0.7% aluminium and 0.1 to 1.5% titanium and having a core containing 80 to 95% lime and 20 to 5% aluminium.

2. A welding wire for electric arc welding comprising a ferrous electrode containing 0.05 to 0.7% aluminum and having a core containing 80 to 95% lime and 20 to 5% aluminum.

3. A welding wire for electric arc welding comprising a ferrous electrode containing 0.1 to 1.5% titanium and having a core containing 80 to 95% lime and 20 to 5% aluminum.

FRANZ LEITNER.